Patented Jan. 19, 1954

2,666,747

UNITED STATES PATENT OFFICE 2,666,747

MINERAL OIL COMPOSITION CONTAINING COPOLYMERS OF ITACONIC ACID ESTERS AND A VINYL ESTER OF A FATTY ACID

Jeffrey H. Bartlett, Westfield, N. J., assignor to Standard Oil Development Company, a corporation of Delaware No Drawing. Application August 11, 1952, Serial No. 303,829

6 Claims. (Cl. 252—56)

The present invention relates to copolymers of unsaturated dibasic acids and derivatives thereof and other oxygen containing polymerizable materials. More particularly, the invention relates to products which are formed by copolymerizing $\alpha$-methylene dibasic acid esters with vinyl compounds containing oxygen. The present invention further relates to the use of polymeric materials of this general type as additives for lubricating oils and analogous compositions and to the formulation of oil compositions and the like as new products of manufacture. The invention further relates to the processes for producing products of the character referred to above.

The prior art suggests that certain polymeric materials derived from $\alpha,\beta$-unsaturated acids, their anhydrides, and the like, may have utility as lubricating oil additives. Thus, the patent to Blair, U. S. 2,384,595, suggests that polymeric compositions may be obtained by reacting $\alpha,\beta$-unsaturated acids or anhydrides with certain aliphatic or cycloaliphatic unsaturated alcohols. The applicant's copending application, Serial No. 37,091, now abandoned, recites the polymerization of $\alpha,\beta$-unsaturated dibasic acid esters wherein the ester group contains from 10 to 16 carbon atoms. This polyester is described as an excellent pour depressant. The present invention relates to materials which are somewhat analogous to those recited in the Blair patent and in the applicant's copending application in that certain $\alpha,\beta$-unsaturated acid esters of the $\alpha$-methylene type are employed. However, the products of the present invention differ from those described in Blair in several respects, of which may be mentioned the fact that Blair employed an acid or anhydride as one monomer, and an unsaturated alcohol having at least three carbon atoms between the hydroxy group and the olefinic group as the other monomer. With respect to the applicant's copending application, a clear line of distinction is maintained in that the applicant herein is concerned only with copolymers of $\alpha$-methylene unsaturated dicarboxylic acid esters and other polymerizable oxy compounds.

It is well known in the prior art that mineral base lubricating oils and, particularly, lubricating oils such as those used in the crank cases of automotive engines, have serious limitations with respect to pour point and viscosity-temperature relationships unless they are prepared from carefully selected materials or are modified to improve their viscosity and/or their pour characteristics. The present invention has, as a major object, the production of an improved additive material for oils which is suitable both for improving the viscosity index of mineral lubricating oils and for lowering the pour point of waxy mineral lubricating oils.

While reference is made above to lubricants for automotive crank cases, it will be understood that the invention has application to other type lubricants and is applicable generally to hydrocarbon oil fractions and in some instances to synthetic oils which are analogous to naturally occurring mineral oils.

A further object of this invention is to produce a polymeric material which is useful as a thickener for oils and which may be used in various hydrocarbon base stocks derived from various crude oils, such as paraffinic, naphthenic, asphaltic or mixed base groups. A still further object is to prepare a material which does not lose its properties of depressing the pour points of oils upon repeated cycles of temperature change above and below the normal pour points. Many materials which are effective pour point depressors in lubricating oils, for example, become unsatisfactory after being subjected to a large number of temperature changes. This property which is commonly referred to as pour instability is highly objectionable under many conditions where low temperatures are encountered and an object of this invention is to prepare materials and lubricating oils containing such materials which are free from pour instability.

As an important aspect of the present invention, it has been discovered that excellent polymeric lubricating oil additives may be produced by copolymerizing a methylene dicarboxylic acid esters with vinyl compounds containing oxygen, e. g., esters, ethers, ketones and the like. Of particular interest in producing polymeric materials of the character herein described are the esters of itaconic acid. However, esters of other $\alpha$-methylene dicarboxylic acids such as $\alpha$-methylene malonic esters, $\alpha$-methylene glutaric esters and $\alpha$-methylene adipic esters and their derivatives may be used. The general formula of $\alpha$-methylene dicarboxylic acid esters which may be used is shown below:

wherein $n$ = an integer from 0 to 3 and R is an alkyl group containing from 1 to 24 carbon atoms.

The general formula of the vinyl compounds which may be used is $$CH_2=CHX$$

wherein X represents one of the following radicals: —O—CO—R, OR, or CO—R.

It is important in the preparation of copolymers of the type described herein that there be present at least one long chain hydrocarbon radical containing from about 8 to about 24 carbon atoms. These long chains may be present in the $\alpha$-methylene dicarboxylic esters or they may be supplied by the vinyl compound. The presence of these relatively long chains is of value in providing oil solubility and also for imparting desirable properties to the copolymer. For the production of pour depressants, it is essential that there be at least one chain containing 10 or more carbon atoms. These chains may be supplied by the alcohols and acids which are used to prepare the esters of the $\alpha$-methylene dicarboxylic acids and to prepare the vinyl compounds. For example, vinyl esters can be prepared by reacting long chain fatty acids with acetylene or with vinyl acetate, vinyl ethers can be prepared by reacting long chain alcohols with acetylene, and the dicarboxylic acid esters by direct esterification of the acids with long chain alcohols. Saturated primary alcohols are preferred although secondary or tertiary alcohols may be used. Branched chained primary alcohols may also be used providing they contain a straight chain of about 6 or more carbon atoms. Synthetic alcohols, such as are produced from carbon monoxide and hydrogen, or by the "oxo" reaction wherein olefins are reacted with carbon monoxide and hydrogen, also are suitable. Synthetic acids derived by the oxidation of petroleum, by the oxidation of oxo aldehydes and by the reaction of olefins, carbon monoxide and water may be employed. Saturated acids are preferred although unsaturated acids are usable providing gelatinous insoluble copolymers are not produced as a result. One commercially available alcohol suitable for this purpose may be obtained from the hydrogenation of coconut oil. Such a product is sold under the trade name "Lorol" and is a mixture of saturated straight chain alcohols ranging from 10 to 18 carbon atoms and having a major proportion of lauryl alcohol which has 12 carbon atoms. Other related products are made by separating this material, which may be considered as a crude mixture, into several different fractions having a relatively higher proportion of the higher, lower, or medium constituent thereof. The composition of Lorol per se and related products, "Lorol B" and "Lorol R," is approximately as follows:

*Composition of mixtures of commercial alcohols*

|  | Lorol | Lorol B | Lorol R |
|---|---|---|---|
| $C_{10}$ percent | 4 | 3 | 1 |
| $C_{12}$ do | 55.5 | 46 | 85 |
| $C_{14}$ do | 22.5 | 24 | 13 |
| $C_{16}$ do | 14 | 10 | 1 |
| $C_{18}$ do | 4 | 17 |  |
| Average number of carbon atoms | 12.8 | 13.5 | 12.2 |

It will be understood that mixtures of different $\alpha$-methylene dicarboxylic derivatives and of different vinyl compounds can be employed in preparing the copolymers of the invention.

Half esters of $\alpha$-methylene dicarboxylic acids may also be used in the preparation of copolymers. The resulting products contain free carboxyl groups which may be used as such or which may be neutralized by reacting with an alcohol, a primary or secondary amine or with ammonia or with a metal-containing compound to obtain an esterified, amidized or imidized product or an ammonium or a metallic salt.

Various conditions of copolymerization may be used in this invention involving either bulk or emulsion technique. In bulk polymerization diluents may or may not be used. Temperatures may vary from 25° C. to 150° C. for periods ranging from 1 to 100 hours and in the presence of various types of catalysts such as benzoyl peroxide, t-butyl hydroperoxide, cumene hydroperoxide and other peroxides, aluminum chloride, boron fluoride and the like.

The average molecular weight of the finished polymeric material should not be less than 1000 or more than 50,000. The preferred range is about 5,000 to 20,000, a molecular weight of 7,000 to 17,000 being especially preferred.

The copolymers which are produced according to this invention not only are suitable pour depressants and viscosity index improvers but also are rust inhibitors, detergents, and generally improve the condition of the engines in which they are used. These copolymers may also be used in compounding greases, waxes, and the like and may also be used in conjunction with other additive materials such as pour depressants, V. I. improvers, rust inhibitors, detergents, extreme pressure agents, dyes, and the like.

The $\alpha$-methylene dicarboxylic acid esters used in the present invention are prepared in accordance with the applicant's copending application, Serial No. 37,091, and do not form a part of the present application.

The invention will better be understood from the specific examples described hereinafter which are illustrative only and are not to be construed as limiting the scope of the applicant's invention.

EXAMPLE I

A 1 liter 3 necked flask equipped with a thermometer, stirrer and reflux condenser was charged with 150 g. of an extracted Mid-Continent oil of SAE 10 grade and 270 g. of Lorol B itaconate. The blend was heated to 80° C. and then the air was replaced with $N_2$ after which 3.0 g. of benzoyl peroxide was added. To this mixture 30 g. of freshly distilled vinyl acetate was added through the condenser during 1½ hours. The reaction was continued for a total of 22 hours at 80° C. Viscosity of the copolymer in the oil was 1540 Saybolt seconds at 210° F.

EXAMPLE II

This copolymerization was carried out under the same conditions as used in Example I except that the following quantities were used: 150 g. of extracted Mid-Continent oil, 255 g. Lorol B itaconate, 45 g. vinyl acetate and 3.0 g. benzoyl peroxide. The viscosity of the resulting copolymer in the oil was 4906 Saybolt seconds at 210° F.

EXAMPLE III

This copolymerization was also similar to Example I but with the following quantities: 150 g. extracted Mid-Continent oil, 240 g. Lorol B itaconate, 60 g. vinyl acetate, and 3.0 g. benzoyl peroxide. The viscosity of the resulting copolymer was 13,707 Saybolt seconds at 210° F.

EXAMPLE IV

This copolymerization was carried out under the same conditions used in Example I but with the following quantities: 150 g. extracted Mid-Continent oil, 225 g. Lorol B itaconate, 75 g. vinyl acetate and 3.0 g. benzoyl peroxide. The copolymerization was continued for 21 hours after which the copolymer was diluted to a 20% blend in the extracted Mid-Continent oil. The viscosity of the 20% blend was 208 Saybolt seconds at 210° F.

EXAMPLE V

A 1 liter 4 necked flask equipped with a stirrer, thermometer and reflux condenser was charged with 120 g. of a white oil having a viscosity of 43 S. U. seconds at 210° F. and 144 g. Lorol B itaconate then heated in an oil bath to 70° C. The air was replaced with $N_2$ after which 36 g. of freshly distilled vinyl acetate was added through the condenser. To this mixture was added a total of 2.16 g. benzoyl peroxide during 2 hours in 3 portions. The copolymerization was continued for 19 hours at 70° C. after which the copolymer was diluted to a 20% blend in a lubricating oil of an SAE 10 grade. The viscosity of the 20% blend was 747 Saybolt seconds at 210° F.

The copolymers obtained by the processes described in Examples I to V were tested in a number of different reference oils. Reference Oil A is an extracted Mid-Continent neutral+bright stock having a V. I. of 114 and a viscosity of 45.5 Saybolt seconds at 210° F. Reference Oil B is an extracted Mid-Continent neutral+bright stock having a V. I. of 103 and a viscosity of 46.1 Saybolt seconds at 210° F. Reference Oil C is a conventionally refined Mid-Continent neutral+3½% bright stock having a V. I. of 95 and a viscosity of 43.6 Saybolt seconds at 210° F. Reference Oil D is a commercial lubricating oil of 98 V. I. and a viscosity of 44.8 Saybolt seconds at 210° F. Reference Oil E is a commercial lubricating oil of 101 V. I. and a viscosity of 45.9 Saybolt seconds at 210° F. The pour characteristics of the blends of the copolymers in these reference oils were determined by the ASTM test and by the S. O. D. Pour Stability Test—Cycle A. The results are shown in the following table:

Table I

| Copolymer Examples | Percent Concentration of Active Ingredient | Highest Solid Point of Oil C Blend in S. O. D. Pour Stability Test—Cycle A | ASTM Pour Points of Blends in Reference Oils, ° F. | | | | |
|---|---|---|---|---|---|---|---|
| | | | A | B | C | D | E |
| None | | +30 | +5 | +15 | +30 | +5 | +20 |
| Ex. I | 0.025 | | −10 | −20 | −15 | | |
| | 0.05 | | −15 | −20 | −15 | | |
| | 0.1 | <−20 | −15 | −20 | −25 | | |
| | 0.2 | <−20 | | | | | |
| Ex. II | 0.025 | | −10 | −20 | −5 | | |
| | 0.05 | | −15 | −20 | −15 | | |
| | 0.1 | −20 | −15 | −20 | −20 | | |
| | 0.2 | <−20 | | | | | |
| Ex. III | 0.025 | | −10 | −15 | −5 | | |
| | 0.05 | | −15 | −20 | −10 | | |
| | 0.1 | −20 | −15 | −15 | −20 | | |
| | 0.2 | <−20 | | | | | |
| Ex. IV | 0.2 | <−20 | −15 | −20 | −30 | | |
| Ex. V | 0.01 | | | | | +5 | −10 |
| | 0.02 | | | | | 0 | −15 |
| | 0.04 | | | | | −5 | −15 |
| | 0.08 | | | | | −15 | −20 |

Examples IV and V were blended in Oils A and C to test for viscosity with the following results:

Viscosity index improving properties of copolymers

| Example | Weight Percent Active Ingredient | Base Stock | SUS, Vis. 210 | V. I. |
|---|---|---|---|---|
| | None | Oil A | 45.5 | 114 |
| IV | 3.6 | do | 53.8 | 134 |
| | None | Oil C | 43.6 | 95 |
| V | 0.2 | do | 44.3 | 101 |
| | 0.4 | do | 45.0 | 105 |
| | 0.8 | do | 46.4 | 112 |

EXAMPLE VI

In order to test the effect of increasing the chain length of the vinyl ester, Example V above was repeated using vinyl acetate, and for comparative purposes it was again repeated using vinyl laurate instead of the vinyl acetate. The copolymers so prepared were blended in 0.1 weight percent and 0.2 weight percent in two reference oils, Oil A' and Oil C. Oil A' differs from Oil A above only in that it has not been so stringently dewaxed, and has a pour point of +15° F. as compared to +5° F. for Oil A. Standard ASTM pour point determinations were run on the blends and the results are set out in Table II below:

Table II

| Vinyl ester used | ASTM Pour Points (° F.) | | | | | |
|---|---|---|---|---|---|---|
| | Oil A' | | | Oil C | | |
| | 0.0 | 0.1 | 0.2 | 0.0 | 0.1 | 0.2 |
| Vinyl acetate | +15 | −15 | −25 | +30 | −25 | −25 |
| Vinyl laurate | +15 | −15 | −15 | +30 | −5 | −15 |

This application is a continuation-in-part of Serial No. 68,085, filed December 29, 1948, now abandoned, for the same inventor.

What is claimed is:

1. A lubricating composition consisting essentially of a waxy mineral oil having combined therein from 0.01 to 10.0% by weight, based on the weight of the total composition, of a copolymer of from about 270 to 144 parts by weight of an itaconic acid ester having from 10 to 18 carbon atoms in each ester group and from about 75 to 30 parts by weight of a vinyl ester of a fatty acid having from 2 to 18 carbon atoms, said copolymer having a molecular weight within a range of from 2,000 to 20,000.

2. A composition according to claim 1 wherein the vinyl ester is vinyl laurate.

3. A lubricating composition consisting essentially of a waxy mineral lubricating oil having combined therein from 0.01 to 10.0% by weight, based on the weight of the total composition, of a copolymer of from about 270 to 144 parts by weight of an itaconic acid ester having from 10 to 18 carbon atoms in each ester group and from about 75 to 30 parts by weight of vinyl acetate, said copolymer having a molecular weight within a range of from 2,000 to 20,000.

4. A lubricating composition consisting essentially of a waxy mineral lubricating oil having combined therein from 0.01 to 10.0% by weight, based on the weight of the total composition, of a copolymer of from 270 to 144 parts by weight of an aliphatic ester of itaconic acid wherein the aliphatic esterifying groups contain from 10 to 18 carbon atoms and from 75 to 30 parts by weight of vinyl acetate, said copolymer having a molecular weight within a range of from 5,000 to 18,000.

5. A lubricating composition consisting essentially of a waxy mineral lubricating oil having combined therein from 0.01 to 10.0% by weight, based on the weight of the total composition of a copolymer of from 270 to 144 parts by weight of an aliphatic ester of itaconic acid wherein the esterifying groups are derived from the mixed alcohols obtained by the hydrogenation of coconut oil, said mixed alcohols having an average number of carbon atoms of 13.5, and from 75 to 30 parts by weight of vinyl acetate, said copolymer having a molecular weight within a range of from 2,000 to 20,000.

6. A lubricating composition consisting essentially of a waxy mineral lubricating oil having combined therein from 0.1 to 10.0% by weight, based on the weight of the total composition, of a copolymer formed by copolymerizing from 270 to 144 parts by weight of an itaconic acid ester formed by esterifying itaconic acid with a mixture of alcohols obtained by the hydrogenation of coconut oil, said mixture of alcohols having an average number of carbon atoms of 13.5 and from 75 to 30 parts by weight of vinyl acetate, said copolymer having a molecular weight within the range of from 5,000 to 18,000.

JEFFREY H. BARTLETT.

References Cited in the file of this patent

UNITED STATES PATENTS

| Number | Name | Date |
|---|---|---|
| 2,020,703 | Schumann | Nov. 12, 1935 |
| 2,366,517 | Gleason | Jan. 2, 1945 |
| 2,375,516 | Blair | May 8, 1945 |
| 2,380,304 | Gleason | July 10, 1945 |
| 2,616,849 | Grammaria | Nov. 4, 1952 |
| 2,616,853 | Grammaria | Nov. 4, 1952 |